April 7, 1959     C. T. WALLIS     2,880,445
WINDSHIELD WIPER CABLE DRIVE ASSEMBLY
Filed March 4, 1955
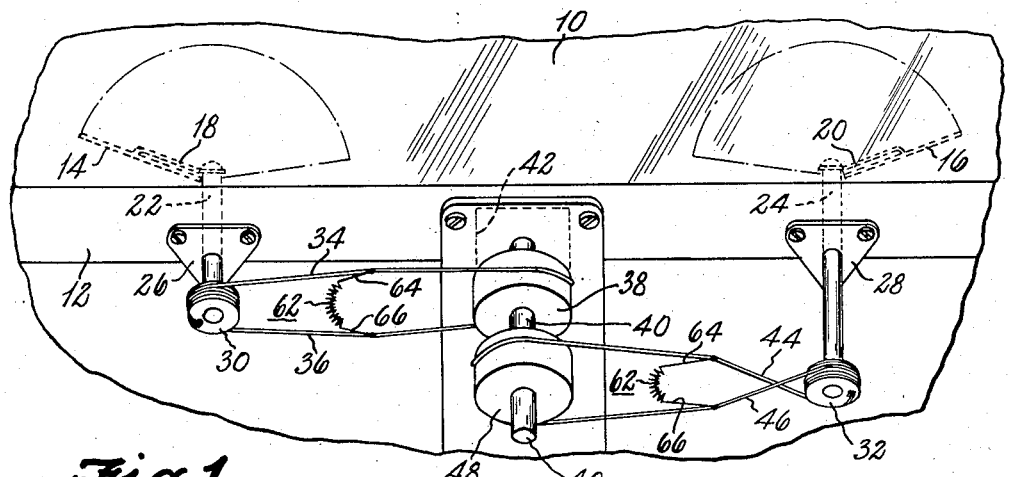
Fig. 1.
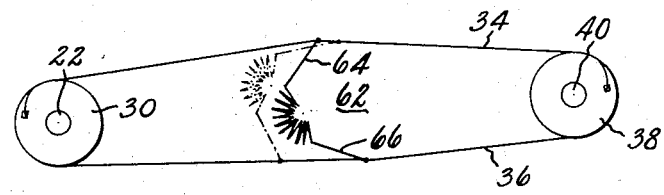
Fig. 2.
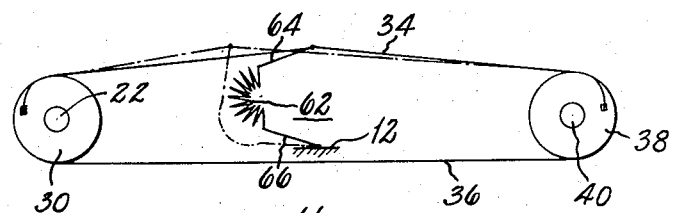
Fig. 3.
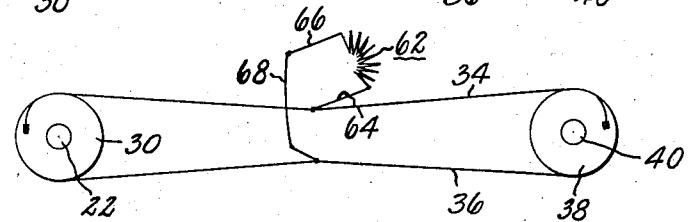
Fig. 4.
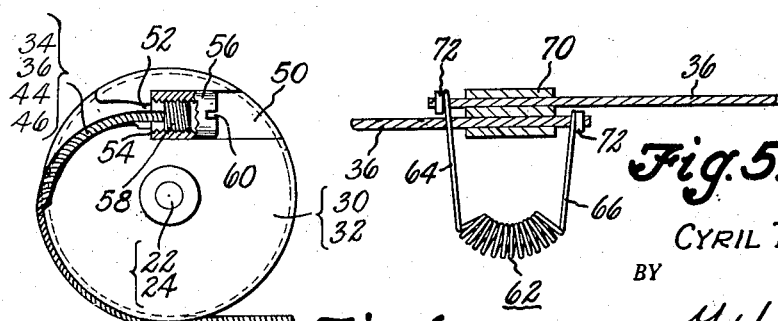
Fig. 5.
Fig. 6.
INVENTOR.
CYRIL T. WALLIS
BY
Y. H. Strickland
ATTORNEY

United States Patent Office 2,880,445
Patented Apr. 7, 1959

2,880,445

WINDSHIELD WIPER CABLE DRIVE ASSEMBLY

Cyril T. Wallis, Brockport, N.Y., assignor to General Motors Corporation, Detroit, Mich., a corporation of Delaware Application March 4, 1955, Serial No. 492,239

7 Claims. (Cl. 15—253)

This invention pertains to the art of windshield wiping, and particularly to an improved cable drive means for transmitting motion from a wiper motor to a wiper actuating shaft, or a pair of shafts.

Heretofore, the problem of automatically tensioning the cables of a wiper installation having a cable drive has not been satisfactorily solved. Various types of cable tensioners have been devised, such as spring loaded pulley assemblies and turnbuckles. However, devices of this character require some means to adjust the cable tension after periods of use to prevent slack therein, which renders a cable drive inoperable. The present invention relates to a cable drive including automatically adjustable spring means which are incorporated in the cable drive and maintain the cables taut without adjustment for the life of the installation. Accordingly, among my objects are the provision of a cable drive for windshield wipers including means for applying spring pressure to the cables between the driving and driven members; the further provision of a cable drive including spring means which exert a substantially constant pressure throughout a wide range of deformation; and the still further provision of a cable drive including manual means for initially tensioning the cables.

The aforementioned and other objects are accomplished in the present invention by incorporating the spring tensioning means within the cable drive so that the spring means are movable therewith. Specifically, the wiper drive assembly includes a motor driven, oscillatable pulley assembly, a transmission assembly for each wiper, and cable means interconnecting the driving pulley assembly and the transmission assemblies to effect asymmetrical operation of a pair of wipers.

Each transmission assembly includes a pulley having a pair of peripheral grooves about which a pair of cables are trained, one end of each cable being secured thereto. In particular, each cable end arranged for connection to the transmission pulley has attached thereto an externally threaded member, or screw. Each pulley groove extends helically inward and terminates in a pocket within which the screw is disposed, thereby preventing accidental disconnection therebetween. An internally threaded member, or nut, is threadedly connected with the screw and disposed within the pocket. The nut engages an abutment and is formed with an externally accessible screw driver slot whereby the cables may be originally tightened after assembly by rotating the nut, thereby effecting axial movement of the screw and the cable.

The other ends of the cables are suitably secured to the driving pulley, or if a driving pulley is not used, these cable ends may be secured to a rocker arm. In the preferred embodiment, a deformable coiled compression spring, which exerts a substantially constant pressure over a wide range of deformation has its opposed extremities connected to an intermediate portion of each cable. In this manner, the cables are spread apart by the spring so as to automatically maintain the cables taut at all times without further adjustment for the life of the installation. Moreover, although a constant pressure compression spring is disclosed herein, an ordinary compression spring may be employed with satisfactory results to make a more economical installation. Hence, the use of a constant pressure spring is only exemplary and is not to be construed as a limitation except in so far as specifically recited in the claims appended hereto.

In a second embodiment, one extremity of the constant tension spring is connected to one cable and the other end to a fixed support. In a third embodiment, opposite extremities of the spring are attached to the cables and the spring tends to urge the cables towards each other. In a fourth embodiment, each cable is split and a spring is interposed between the opposed ends thereof.

Further objects and advantages of the present invention will be apparent from the following description, reference being had to the accompanying drawing wherein preferred embodiments of the present invention are clearly shown.

In the drawing:

Fig. 1 is a fragmentary elevational view of a motor vehicle embodying the improved cable drive assembly.

Fig. 2 is a schematic view illustrating the preferred automatic cable tensioning arrangement.

Figs. 3, 4 and 5 are schematic views illustrating modified embodiments of the present invention.

Fig. 6 is a view, in elevation, of the cable seat arrangement for manually tensioning the cables after installation.

With particular reference to Fig. 1, the windshield wiper drive assembly of this invention is shown installed on a vehicle having a windshield 10 and a firewall 12. A pair of wipers 14 and 16 are arranged for asymmetrical oscillation across the outer surface of the windshield 10. The wiper blades 14 and 16 are detachably carried by wiper arms 18 and 20, respectively, which are drivingly connected with spaced transmission shafts 22 and 24. Transmission shafts 22 and 24 are rotatably supported by brackets 26 and 28, which are carried by the firewall 12.

Transmission shafts 22 and 24 have attached thereto driven pulley assemblies 30 and 32, respectively. Transmission pulley 30 has a pair of peripheral grooves about which a pair of cables 34 and 36 are trained, one end of each cable being connected to the pulley assembly 30 in a manner to be described hereinafter. The other ends of cables 34 and 36 are connected to a driving pulley 38, which is connected to an oscillatable shaft 40. The shaft 40 is drivingly connected to any suitable motor 42.

Similarly, the transmission pulley 32 has a pair of peripheral grooves about which cables 44 and 46 are trained, one end of each of the cables being secured to the pulley assembly 32. The cables 44 and 46 are crossed so as to assure asymmetrical movement of the wiper blades 14 and 16. The other ends of the cables 44 and 46 are secured to a second driving pulley 48, which is, likewise, secured to the shaft 40. If desired, a drive arm assembly of the type disclosed in the McClelland Patent 2,660,-894 may be substituted for the driving pulleys 38 and 48. However, if the driving pulley arrangement is used, the ends of the cables 34, 36, 44 and 46 may be secured to their respective driving pulleys in any suitable manner, such as shown in the McClelland Patent 2,617,315.

With particular reference to Fig. 6, the manner in which the ends of cables 34, 36, 44 and 46 are secured to the driven pulley assemblies 30 and 32 will be described. Each pulley assembly 30 and 32 is formed with a pair of peripheral grooves, which extend helically inward and terminate in a pocket 50. The pocket is connected with the peripheral grooves through a restricted opening 52, which presents a shoulder 54 against which a nut 56 abuts. Each end of each cable has rigidly connected thereto a screw 58, which threadedly engages the nut 56. In addition, the nut 56 has a screwdriver slot 60, which is accessible exteriorly whereby the nut 56 may be rotated, thereby effecting axial movement of the screw 58 and the cable attached thereto. In this manner, the cables may be originally tightened upon installation.

With particular reference to Figs. 1 and 2, the preferred cable tensioning means will be described. A constant compression spring 62, which may be of the type shown in the Foster Patent 2,630,316, has its opposite ends 64 and 66 attached to cables 34 and 36, the spring 62 tending to spread the cables apart so as to automatically maintain the cables taut at all times. The spring 62 is preferably of the type which exerts a substantially constant pressure over a wide range of deformation. Therefore, after initially manually tightening the cables at the transmission pulleys 30 and 32, the springs 62 will automatically maintain the requisite cable tautness throughout the life of the cable installation. Inasmuch as the spring moves with the cables, the spring does not add any appreciable amount of load to the driving mechanism other than the inconsequential axial bending load of the spring itself. Furthermore, although a constant pressure spring produces the best results, an ordinary compression spring will work satisfactorily in most installations.

A second embodiment of the improved cable tensioning arrangement is shown in Fig. 3 wherein end 64 of the spring 62 is secured to cable 34 while end 66 of the spring is secured to a fixed support, such as the firewall 12. In this embodiment the single spring tensions both cables by acting on cable 34 and winding cable 36 around the pulley 38.

In a third embodiment, as shown in Fig. 4, end 64 of the spring 62 is attached to the cable 34, while end 66 is attached to a support member 68 that is connected to the other cable 36. In this embodiment, the spring 62 maintains the cables taut by urging them towards each other.

In a still further embodiment shown in Fig. 5, one of the cables 36 or 46 is split intermediate its length, the split ends thereof slidably extending through a guide member 70. Each split end of the cable has attached thereto a ferrule 72. Ends 64 and 66 of the spring 62 are hooked around the split ends of the cable and tend to urge these ends away from each other so as to maintain the requisite cable tautness. The cables are tensioned in the same manner described in conjunction with Fig. 3. Alternatively, each cable may have its own spring.

From the aforegoing, it is apparent that the present invention results in a cable drive assembly wherein the requisite cable tension is maintained automatically throughout the life of the installation. Furthermore, the improved cable tensioning means are extremely simple and are believed to constitute a definite advance in the art.

While the embodiments of the present invention as herein disclosed, constitute preferred forms, it is to be understood that other forms might be adopted.

What is claimed is as follows:

1. A windshield cleaner assembly comprising, a wiper, a wiper motor, a rotatable shaft connected to said wiper, a pulley assembly affixed to said shaft, a pair of drive cables extending between said motor and said pulley assembly, and constant pressure spring means connected to said cables and movable therewith for automatically tensioning said cables, said constant pressure spring means comprising a deformable coiled compression spring being particularly characterized by exerting a substantially constant pressure over a wide range of deformation, opposite ends of said spring being attached to intermediate portions of said cables.

2. A windshield cleaner assembly comprising, a wiper, a wiper motor, a rotatable shaft connected to said wiper, a pulley assembly affixed to said shaft, a pair of drive cables extending between said motor and said pulley assembly, and constant pressure spring means connected to said cables and movable therewith for automatically tensioning said cables, said constant pressure spring means comprising a deformable coiled compression spring being particularly characterized by exerting a substantially constant pressure over a wide range of deformation, opposite ends of said spring being attached to intermediate portions of said cables, said spring being arranged to spread said cables apart.

3. A windshield cleaner assembly comprising, a wiper, a wiper motor, a rotatable shaft connected to said wiper, a pulley assembly affixed to said shaft, a pair of drive cables extending between said motor and said pulley assembly, and constant pressure spring means connected to said cables and movable therewith for automatically tensioning said cables, said constant pressure spring means comprising a deformable coiled compression spring being particularly characterized by exerting a substantially constant pressure over a wide range of deformation, opposite ends of said spring being attached to intermediate portions of said cables, said spring being arranged to urge said cables towards each other.

4. A windshield cleaner assembly comprising, a wiper, a wiper motor, a rotatable shaft connected to said wiper, a pulley assembly affixed to said shaft, a pair of drive cables extending between said motor and said pulley assembly, and constant pressure spring means connected to said cables and movable therewith for automatically tensioning said cables, said constant pressure spring means comprising a deformable coiled compression spring being particularly characterized by exerting a substantially constant pressure over a wide range of deformation, one end of said spring being attached to one of said cables and the other end of said spring being attached to a fixed support.

5. A windshield cleaner comprising, a wiper, a wiper motor, a rotatable shaft connected to said wiper, a pulley assembly affixed to said shaft, a pair of drive cables extending between said motor and between said pulley assembly, and spring means connected to intermediate portions of said cables and movable therewith for automatically tensioning said cables, said spring means spreading said cables apart.

6. A windshield cleaner comprising, a wiper, a wiper motor, a rotatable shaft connected to said wiper, a pulley assembly affixed to said shaft, a pair of drive cables extending between said motor and between said pulley assembly, and spring means connected to intermediate portions of said cables and movable therewith for automatically tensioning said cables, said spring means being connected to said cables so as to urge said cables towards each other.

7. A windshield cleaner comprising, a wiper, a wiper motor, a rotatable shaft connected to said wiper, a pulley assembly affixed to said shaft, a pair of drive cables extending between said motor and between said pulley assembly, and a spring having one end connected to an intermediate portion of one of said cables and the other end connected to a fixed support for automatically tensioning said cables.

References Cited in the file of this patent

UNITED STATES PATENTS

| | | |
|---|---|---|
| 1,413,818 | Wilkinson | Apr. 25, 1922 |
| 2,117,701 | Burnett | May 17, 1938 |
| 2,418,565 | Wohler | Apr. 5, 1947 |
| 2,574,504 | Sivacek | Nov. 13, 1951 |
| 2,609,561 | Wernig | Sept. 9, 1952 |
| 2,611,148 | Rappl | Sept. 23, 1952 |
| 2,630,316 | Foster | Mar. 3, 1953 |
| 2,661,492 | Oishei | Dec. 8, 1953 |